(12) United States Patent
Gouskov et al.

(10) Patent No.: US 6,536,240 B1
(45) Date of Patent: Mar. 25, 2003

(54) METHOD OF MAKING AN OPTICAL FIBER PREFORM VIA MULTIPLE PLASMA DEPOSITING AND SINTERING STEPS

(76) Inventors: Mikhail Ivanovich Gouskov, St. Ivana Fomina 13-1, Apt. 604, 194352 St. Petersburg (RU); Evgueni Borisovich Danilov, Bolshevikov Pr. 9-2, Apt. 11, 193313 St. Petersburgh (RU); Mohammad Afzal Aslami, 7 Laurel Hill Dr., Sturbridge, MA (US) 01566; Dau Wu, 4475 Rosecliff Pl., San Diego, CA (US) 92130; John Edward Mattison, 236 W. Main St., West Brookfield, MA (US) 01585

( * ) Notice: Subject to any disclaimer, the term of this patent is extended or adjusted under 35 U.S.C. 154(b) by 49 days.

(21) Appl. No.: 09/588,312

(22) Filed: Jun. 6, 2000

Related U.S. Application Data

(63) Continuation-in-part of application No. 09/058,207, filed on Apr. 10, 1998, now abandoned.

(51) Int. Cl.[7] .............................................. C03B 37/07
(52) U.S. Cl. .............................. 65/391; 65/421; 65/427
(58) Field of Search ........................... 65/391, 421, 427

(56) References Cited

U.S. PATENT DOCUMENTS

| | | | | |
|---|---|---|---|---|
| 4,162,908 A | * | 7/1979 | Rau et al. ................... | 385/123 |
| 4,265,649 A | * | 5/1981 | Achener ...................... | 65/17.4 |
| 4,493,720 A | * | 1/1985 | Gauthier et al. ............ | 427/166 |

FOREIGN PATENT DOCUMENTS

| | | | | |
|---|---|---|---|---|
| JP | 4-231336 | * | 8/1992 | ................. 65/421 |

* cited by examiner

Primary Examiner—John Hoffman
(74) Attorney, Agent, or Firm—Patton Boggs LLP

(57) ABSTRACT

A method for producing an optical fiber preform starting with a first-generation target typically comprising pure silica. A plasma torch deposits an annular region of doped silica to form an intermediate structure. The intermediate structure is drawn down to a second-generation target and another annular region of doped silica is deposited. The process is repeated a plurality of times until an Nth generation target is formed. The deposition optionally employs repeated cycles of depositing a plurality of layers of silica at a high traversal rate without sintering, followed by periodic sintering. In a further embodiment, stabilizer bars extending out from the plasma coils improve distribution of the deposition material. Another embodiment injects the source gas into a particular region of the plasma for control of soot deposition.

18 Claims, 5 Drawing Sheets

METHOD OF MAKING AN OPTICAL FIBER PREFORM VIA MULTIPLE PLASMA DEPOSITING AND SINTERING STEPS

RELATED APPLICATIONS

This is a continuation-in-part of U.S. application Ser. No. 09/058,207 filed Apr. 10, 1998 ABANDONED.

BACKGROUND OF THE INVENTION

The present invention relates to optical fibers and, more particularly, to a method and apparatus for making an optical fiber preform using plasma outside vapor deposition process.

Various methods and techniques are known in the relevant art for making silica glass optical fiber preforms. One known method for fabricating preforms starter tubes is to heat silica and extrude it through an aperture. Another method known in the art for forming optical fiber preforms employs steps of depositing silica, either doped or undoped in accordance with desired optical properties of the finished fiber, onto a target. Several techniques for such deposition are known, including modified chemical vapor deposition (MCVD), vapor axial deposition (VAP), and outside vapor deposition (OVD). Each of these deposition methods begins with a rotating target, which can be glass, ceramic or other materials. The target can be a solid rod or a tube, with or without a reinforcing element inserted within it. Depending on the method, the target may become part of the perform and hence of the completed optical fiber, or may be removed by a later step of the fabrication process. A heat source, which can be a chemical reaction type gas burner or a plasma source, is positioned proximal to the rotating target. The position can be beneath, above, or spaced in a horizontal direction relative to the rotating axis of the target. As known in the art, the function of the heat source if to raise the temperature in the deposition zone sufficiently high for the glass-forming reactions to occur, thereby forming the desired glass particles. Depending upon which of the processes is used, the deposited glass particles are dried and sintered by another heat source, which is done by the VAD and OVD methods, or are fused into a vitreous quarts by the same heat source as was used for the deposition, as is done in the MCVD method.

For each of these deposition methods, when the target is mounted horizontally the heat source travels along with the deposition point, along the length of the target. This is done to ensure uniform deposition. If the target is a tube, the glass forming particles and materials may be deposited either on the inside surface of the tube, or on the outside surface. If the deposition is on the inside then the outside diameter remains constant, which deposition on the outside causes the outside diameter to increase.

If, on the other hand, the target is mounted vertically, the heat source is located either vertically above or laterally across. The deposition results in a substantially cylindrical product who's diameter and length increase as deposition continues.

Examples of these and other known deposition methods appearing in the various United States Letters Patent are:

U.S. Pat. No. 3,737,292 to Keck et al. discloses a method of forming optical fibers. Multiple layers with predetermined index of refraction are formed by flame hydrolysis and deposited on the outside wall of a starting rod or member. After these layers of glass are coated on the rod the resulting hollow cylinder is heated and collapsed to form fibers.

U.S. Pat. No. 4,224,046 to Izawa et al. teaches a method for manufacturing an optical fiber preform. Two gaseous raw glass forming materials, oxygen, hydrogen and argon are jetted upwards in a burner towards a vertically mounted, rotating cylindrical start member. Soot-like glass particles are formed by flame hydrolysis and deposited on the lower end of the start member. The start member is gradually withdrawn upwards to maintain a constant spacing between the its growing end and the burner. Upon completion of the deposition, the resulting soot-like glass preform is then dried and sintered to form a transparent glass preform.

U.S. Pat. No. 4,217,027 to MacChesney et al. teaches the fabrication of preforms by what is usually referred to as the Modified Chemical Vapor Deposition (MCVD) process. In this process, a vapor stream consisting of chlorides or hydrides of silicon and germanium with oxygen is directed to the inside of a glass tube. The chemical reactions among these chemicals, which are preferentially induced by a traversing hot zone, will under proper conditions result in the formation of glass on the inner wall of the tube. The particular matter deposited on the tube is fused with each passage of the hot zone.

U.S. Pat. No. 4,412,853 to Partus discloses an MCVD process to form an optical fiber preform starter tube. The process starts with a horizontally mounted, rotating tubular target formed from glass and having a preselected composition and optical characteristics. A vapor stream is fed through the tubular target as a heat source positioned beneath the tubular target, traverses along the latter's length. This causes reaction products of the vapor stream to be deposited on, and fuse to, the interior surface of the tubular target. The deposited material has the same index of refraction as the tubular target, but a different composition. This reference also suggests that one may achieve the same effect by an outside vapor-phase oxidation process or an outside vapor-phase axial deposition process, but does not explicitly teach how this can be done.

U.S. Pat. No. 4,741,747 to Geittner et al. is directed to the Plasma Chemical Vapor Deposition (PCVD) method of fabricating optical fibers. In this PCVD method glass layers are deposited on the inner wall of a glass tube by heating the tube to a temperature between 1100° and 1300° C., before passing the reactive gas mixture at a pressure between 1 and 30 hPa, and moving a plasma back and forth inside the glass tube. After the glass layers are deposited, this glass tube is collapsed to produce a solid preform. Optical fibers can be drawn from this preform.

U.S. Pat. No. 5,522,007 to Drouart et al. teaches the use of plasma deposition to build up an optical fiber preform having high hydroxyl ion concentration. In this reference, hydroxyl ions are deliberately entrained in a plasma generating gas by passing the gas through a water tank before it is introduced into one end of a plasma torch having an induction coil. The plasma torch projects molten silica particles mixed with hydroxyl ions onto a rotating substrate preform. This results in a preform having an average hydroxyl ion concentration lying in the range to 50–100 ppm deposited onto the target preform. According to Drouart et al., this technique results in optical fibers having an attenuation of 0.32 dB/km and 0.195 db/km at 1310 nm and 1550 nm, respectively.

In addition to requiring multiple processing steps to fabricate preforms, other disadvantages of the above processes include are:

1. the MCVD and PCVD processes are slower processes because of their low deposition rate;

2. the preform size is limited by the size of the deposition tube for MCVD and PCVD process; and
3. the outside vapor deposition process and the vertical axial deposition process OVD and VAD processes are based on flame hydrolysis which generates excessive amounts water and requires additional drying and sintering steps to produce high quality optical fiber preforms and require:
   a. a deposition of soot particles on a target,
   b. a generation of excessive amount of water as by-product, and
   c. additional drying and sintering steps to produce high quality optical fiber preforms.

SUMMARY OF THE INVENTION

It is an object of the invention to provide an apparatus and method for producing an optical fiber preform having low hydroxyl content, with an increased rate of deposition, using a lower number of steps, while providing for increased preform diameter and, at the same time, increasing the quality and uniformity of the preforms.

In one embodiment of the present invention, a plasma source or torch is supported in proximity to a target rod formed from a primary material such as, for example, pure silica. The target rod is secured at each of its horizontally opposed ends and is rotated about its longitudinal axis. The plasma source deposits silica doped with a known first doping concentration. The doped silica is deposited along the length of the target rod until the latter grows to a desired diameter. The target with the doped silica is then drawn down and a thinned section is extracted for use as a secondary rod. The secondary rod has a center formed from the primary target material and an outer layer formed from the doped silica. Additional silica, having the same doping concentration, is deposited atop this secondary rod until it, too, reaches a desired diameter, and then is drawn down and a section extracted. The steps of depositing drawing down, extracting and depositing may be repeated a number of times. The result is a doped silica rod having a center formed from the primary target material with a first diameter, and an annular layer formed from the doped silica with a second outer diameter.

The doped silica rod is further processed to deposit a second silica layer. More particularly, the doped silica rod is rotated and the plasma torch moved along the length of the doped silica rod to deposit a second or outer layer of doped silica. The resulting structure may then be drawn down and a thinned section extracted, as was done for the first doped silica rod. Depending on the desired optical properties of the fiber to be produced from the preform the dopant of the second, or outer layer may be selected to either increase, or decrease, the index of refraction of the silica. In one variation of the invention the dopant concentration is varied as the outer layer is being deposited, and the result is a graded outer layer. The gradient of the dopant concentration, in accordance with known optical principles for a graded fiber preform, is generally varied from a maximum, beginning concentration level when the outer layer is first being deposited, to a minimum, end concentration level when deposition of the outer layer is almost complete.

In another variation of the invention, the dopant concentration maintained at constant as the outer layer is being deposited, and the result is a preform having a stepped index of refraction, with the index of refraction of the first silica layer typically being different from that of the second layer. The step index is attained by the second dopant concentration, used throughout the deposition of the second or outer layer, being different from the first dopant concentration used for the first silica layer.

A further embodiment of the invention forms the first doped silica layer, or the outer doped silica layer, or both, using repeated cycles of multiple deposition passes of the plasma torch, followed by a single deposition/sintering pass. The deposition/sintering pass both deposits another sublayer of the doped silica and sinters that sublayer along with the sublayers that had been deposited by the multiple deposition passes. The deposition passes do not sinter the doped silica material they deposit because the plasma torch traverses at first rate along a length of the rotating target. The first rate is selected so that the plasma flame moves at a near-maximum rate along the target, without having to impart enough heat to sinter the deposited glass. The deposition/sintering step then traverses the plasma torch at a second rate along the length of the target, the second rate being lower than the first. The second rate is selected so that the plasma flame dwells on the deposited glass sufficiently to sinter the sublayer deposited, along with all of the previously deposited sublayers.

A substantial benefit of this inventive periodic deposition/sintering feature is that the average deposition rate, in terms of grams per minute, can be approximately twice the average deposition rate if each sublayer is deposited by a deposition/sintering pass.

Still another embodiment of the invention, which may be combined with either of the above-summarized embodiments, further comprises a monitoring device for constantly detecting the diameter of the target on which the silica is being deposited, and a plasma torch controller for adjusting the distance between the extreme end of the plasma torch and the target, in response to the detected diameter. The position of the plasma torch is thereby adjusted to accommodate the increasing diameter, which maintains a constant distance between the plasma torch and the target. The present inventors have identified production improvements resulting from maintaining a constant plasma torch to target.

In a further embodiment of the present invention, a cladding layer is deposited onto the intermediate structure comprising the doped silica rod and the outer or second layer. In this embodiment, the dopant concentration of the cladding is selected according to the optical properties desired and according to the dopant concentration, and gradient, of the second layer. More particularly, if a graded second layer was deposited, the cladding layer may be formed from silica doped with the same dopant and same minimum, end concentration level used at the outermost region of the second layer. Alternatively, the cladding layer can be formed from pure silica, or even silica doped with some other dopant and at a third dopant concentration. If desired, the cladding layer may also have a graded doping.

A still further embodiment of the invention includes a stabilizer bar extending from opposite sides of the plasma torch coil. The present inventors have identified benefits with respect to deposition rate, consistency, and uniformity which are provided by the stabilizer bar in accordance with this invention.

In yet another embodiment of the invention the source gas is injected into the plasma just above a point within the plasma at which the velocity along the center axis of the plasma torch is zero. The present inventors have identified that this inventive injection arrangement reduced unwanted deposition of soot along the interior portions of the plasma torch.

An additional feature of the invention, which may be combined with any of the above-identified embodiments, comprises method steps for forming a jacketing layer over the deposited structure comprising the target, the first and the second silica layers. The jacket can be added by either further plasma deposition, or, alternatively, by providing a jacketing material over the structure and then applying heat to collapse the jacketing material into a finished preform.

BRIEF DESCRIPTION OF THE DRAWINGS

These and other features, aspects, and advantages of the present invention can be better understood by referring to the drawings in which.

DETAILED DESCRIPTION OF THE INVENTION

Figure 1:
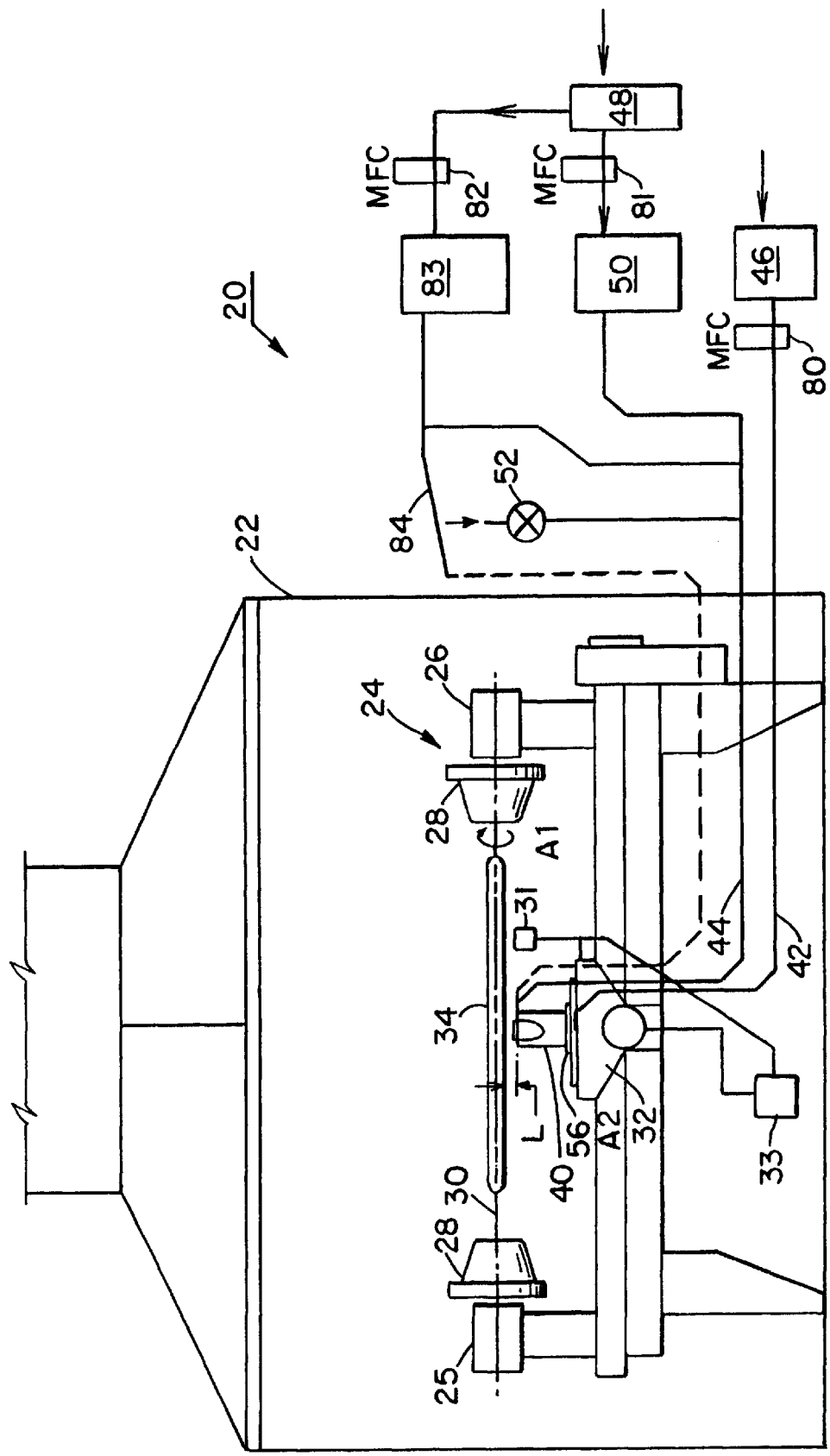
FIG. 1 shows an apparatus used to perform plasma deposition.

FIG. 1 shows an apparatus 20 used for plasma outside vapor deposition (POVD) in accordance with the present invention. The apparatus 20 comprises a chamber 22 which is sealed so as to prevent impurities from being introduced into the final product. Within the chamber 22 is a lathe 24, such as available from Heathway Ltd. or Litton Engineering Lab. The lathe 24 has a headstock 25 and a tailstock 26. The headstock 25 and the tailstock 26 are provided with a pair of opposing rotating spindle chucks 28 which hold the ends of an elongated target 30 having a substantially cylindrical outer wall. The spindle chucks 28 rotate the target 30, as indicated by arrow A1. A movable carriage 32 is cooperatively attached to the lathe 24, in an arrangement permitting travel in either direction along the target, as indicated by double headed arrow A2. A plasma source or torch, shown generally as 40, is supported by carriage 32. Carriage 32 thus moves the plasma source 40 along the length of the target 30. As will be described, the plasma torch moves to deposit material on top of the target 30 to form an optical fiber preform. As shown in FIG. 1, the spindle chucks 28 rotate the target 30 to ensure that material is uniformly deposited by the plasma source 40 around the target so as to form a tubular member 34 having nearly perfectly cylindrical outer walls.

In the FIG. 1 depicted embodiment, the plasma source 40 positioned on the carriage 32 moves in both directions along a substantial portion of the length of the target 30. The movement allows the plasma source 40 to travel along this portion of the target 30 and deposit materials thereon. Alternatively, instead of moving the plasma source 40 along the length of the target, the target 30 may be moved while the plasma source 40 remains stationary. This can be realized by having the headstock 25 and the tailstock 26 of the lathe move the target in a reciprocating fashion so that all relevant portions of the target are brought directly above the plasma source 40.

As another alternative, a plurality (not shown) of plasma sources may be spaced apart along the length of the target. This allows for reduced movement of either the headstock 25 and tailstock 26 of the lathe 24, or the carriage 32 to which the plasma sources are attached, depending on which of the two is configured to move. If a sufficient case number of plasma sources are provided all along the length of the target, then no movement of either the carriage 32 or the headstock 25 and tailstock 26 of the lathe 24 is needed.

Referring to the example embodiment of FIG. 1, the plasma source 40 is a plasma torch having a dry plasma gas introduced into it through a first gas line 42 and a source gas introduced into it through a second gas line 44.

The plasma gas preferably comprises nitrogen and oxygen in an appropriate, predetermined proportion. Alternatively, air may serve as the plasma gas. If air is used, it is filtered, either through an on-site filtration device (not shown) or by a vendor. The filtered air first passes through a first dryer 46 to remove moisture before entering the first gas line 42. The drying ensures that the hydroxyl concentration of the plasma gas is low, on the order of 2.0 ppm, or less. The total volume of gas being delivered is regulated by a mass flow controller (MFC) 80 or, in the alternative, by a flowmeter (not shown).

The source gas comprises a source chemical such as $SiCl_4$, and at least one carrier gas, such as oxygen $O_2$ or nitrogen $N_2$. The carrier gases enter the second dryer 48 to remove moisture. The drying ensures that the hydroxyl concentration of the source gas is also very low, on the order of 0.5 ppm. After the carrier gases are dried, they proceed to a MFC 81 before entering a bubbler 50 to pick up the source chemical. Depending upon the characteristics of the MFC, it is also possible to use it downstream of the bubbler. The gas stream comprising carrier gases laden with the source chemical then proceeds to the second gas line 44. Optionally, by opening valve 52, a dopant gas may be introduced into the gas stream before it reaches the plasma torch.

A preferred source chemical is $SiCl_4$. This chemical is chosen for its reactive properties in a plasma. Specifically, the $SiCl_4$ serves as a source of Si to form $SiO_2$ which is deposited on the target 30. The dopant can be a fluorine dopant gas, in the form of $SiF_4$ or SiFc. Fluorine dopants will lower the index of refraction and also change the viscosity of the silica, or quartz. In addition, fluorine dopants result in increased design flexibility for optical fiber preforms.

On the other hand, if one wishes to increase the index of refraction, $GeO_2$ or other equivalent substance may be used as the dopant. A preferred source chemical for $GeO_2$ is $GeCl_4$. This chemical is chosen for its purity because of its having similar physical and chemical properties $SiCl_4$. The delivery of the $GeCl_4$ will be similar to $SiCl_4$. The carrier gas from the dryer 48, can be split to another branch where it will be regulated by a MFC 82, before proceeding to a bubbler 83 to pick up the source chemical $GeCl_4$—. Similar to the control of chemical $SiCl_4$, the MFC can also be located downstream of the bubbler. This gas stream can feed into the gas line 44 and form a mixture before entering the plasma torch. It is also possible to directly introduce the $GeCl_4$ gas stream by a separate line 84 to the plasma torch. One advantage of using the separated delivery lines is to minimize the competing chemical reactions between $GeCl_4$ and $SiCl_4$—other source chemicals that can be used for doping instead of germanium oxide (GeO2) or co-doping with germanium oxide are materials such as POC131 PC15, and other similar index increasing dopants such as aluminum and titanium containing chemicals.

Figure 2:
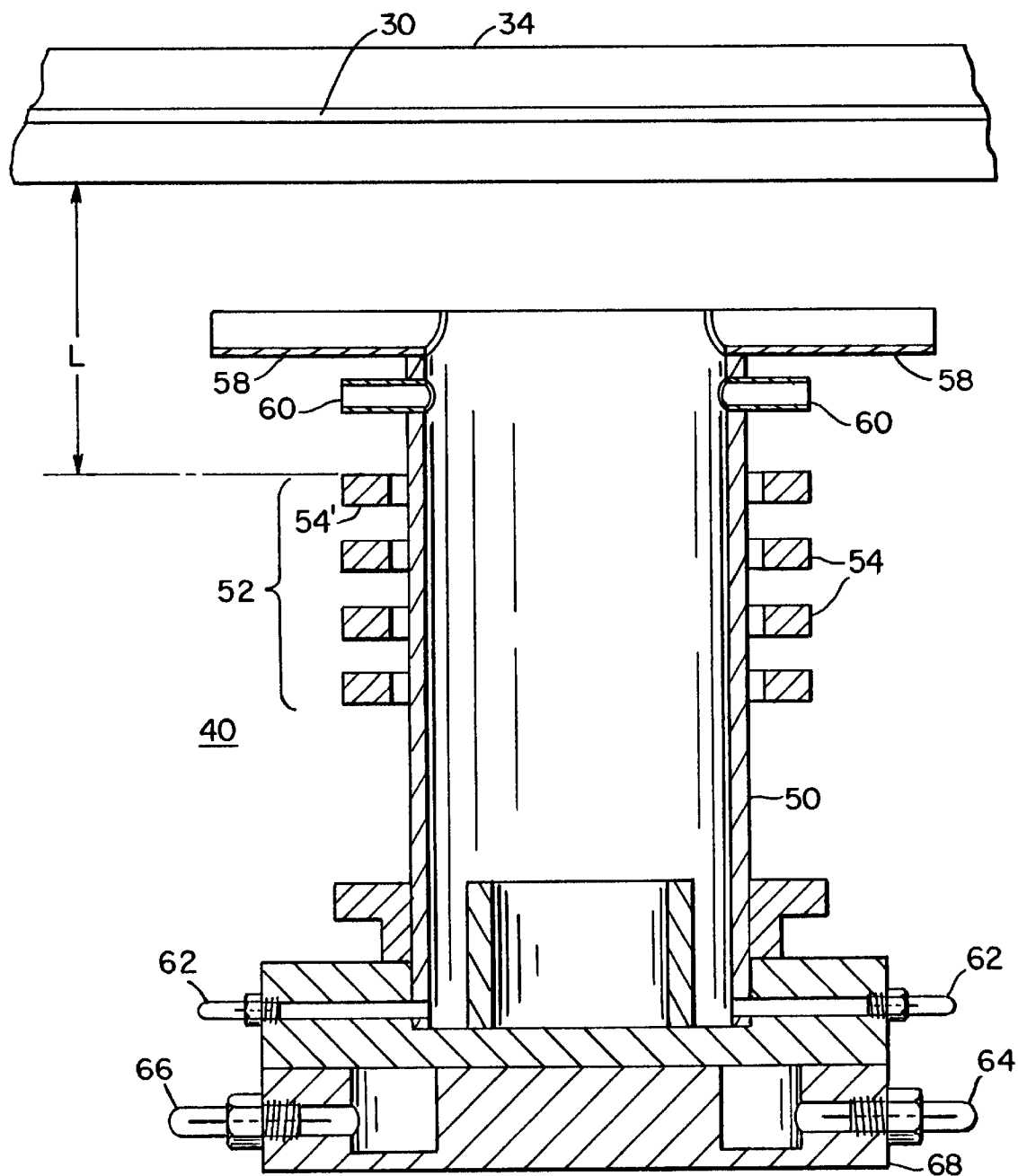
FIG. 2 shows a partial side view of a plasma torch used in the apparatus of FIG. 1.

FIG. 2 shows a cutaway side view of the plasma torch 40 positioned below the target 30. The plasma torch 40 comprises a substantially tubular torch housing formed from quartz. The housing of the depicted example has a diameter of 60 mm and a height of 220 mm. However, diameters ranging from 40–80 mm and heights between 180–400 mm may also be used.

A copper induction coil 52 is provided around the upper portion of the housing 50. The coil 52 comprises a plurality of windings 54 having a diameter of, for example, approximately 72 mm and spaced apart from each other by, for example, 6 mm. An example gap between the housing and the coil can be between 2–10 mm. The uppermost portion of the coil 52, as indicated by uppermost winding 54', is separated from the outer surface of the tubular member 34 by a spacing designated by L, which is on the order of, for example, 30–55 mm.

The present inventors have identified that maintaining L within the described range, or with a similar range depending on site-specific factors but which may be determined quickly by brief trials is important for consistency. However, as the quartz glass is deposited the outer diameter of the target increases. Accordingly, as shown in FIG. 1, an optical, ultrasound, or other sensor 31 is mounted on the carriage 32 to gauge the distance of the radially growing tubular member 34 from the carriage, and a controller 33 adjusts the height of the support stand 56, accordingly. As a result the spacing L is maintained by adjusting the height of a support stand 56 on which the plasma torch 40 is placed quartz glass is deposited. Support stand 56, in turn, is mounted to carriage 32, and moves laterally therewith. Initially, the support stand 56 is set at a predetermined height, and this height is reduced as the diameter of the deposited material increases during deposition. This maintains a predetermined distance between the plasma torch 40 and the deposited material. Multiple alternatives for the sensor 31 are contemplated, including a an ultrasonic distance gauge and a charge coupled device (CCD) camera using frame grabbing software. Examples of a suitable CCD camera include Pulnix TM-1001, or Kodak Megaplus ES 1.0.

The automatic distance control obtained by the sensor 31 and controller 33 is not mandatory and, in the alternative, the distance L can be maintained by manual adjustment, if desired.

Figure 3:
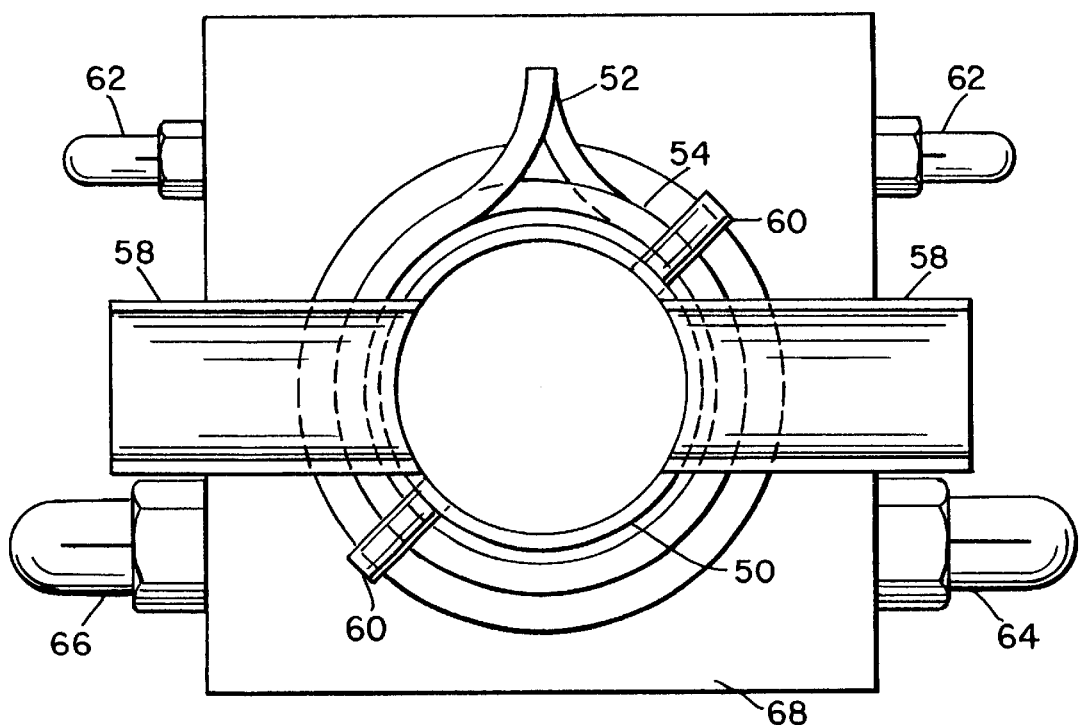
FIG. 3 shows a top view of a variation of the plasma torch shown in FIG. 2.

Referring to FIGS. 2 and 3, on either side of the uppermost portion of the housing 50 is a plasma stabilizer bar 58. Each stabilizer bar is formed from quartz and comprises a U-shaped gutter extending laterally from the rim of the housing 50. Example dimensions of the stabilizer bars 58 are a diameter of 60 mm and extend 20 mm on diametrically opposite sides of the housing rim, although diameters in the range of 40–80 mm and lengths of 15–40 mm may also be used. When the plasma torch 40 is in use the stabilizer bars 58 are aligned parallel to the target. This arrangement helps spread the reactive source chemicals being deposited onto the growing tubular member 34.

As shown in FIGS. 2 and 3, a pair of injection ports 60 connect the second gas line 44 carrying the source chemicals to the plasma torch 40. The injection ports 60 enter the housing at substantially the same height along the housing 50, at a point between the uppermost windings 54' of the coil 52 and the stabilizer bars 58. Example dimensions of the injection ports 60 are a quartz tubing having a diameter of 5 mm, although tubing diameters on the order of 3–10 mm may be used with the plasma torch 40 of the present invention. In the preferred embodiment, a pair of injection ports 60 enter the housing 50 at the same height and are positioned diametrically across from each other. Instead of just two such ports, however, three or even more ports, symmetrically arranged, may be provided. In the example depicted by FIG. 2, the two injection ports 60 are shown to be directly beneath the stabilizer bars. This, however, is not an absolute necessity, and the injection ports 60 may be angularly offset from the stabilizer bars 58, in a top view of the plasma torch, as shown in FIG. 3.

As shown in FIGS. 2 and 3, a pair of plasma gas inlets 62 connect the first gas line 42 carrying the plasma gases to the plasma torch 40. The plasma gas inlets 62 enter the housing at substantially the same height, proximate to the base of the housing. These inlets 62 comprise stainless steel tubing having a diameter of, for example, 5 mm, although a range of diameters may suffice for this purpose. The plasma torch 40 is also provided with a coolant inlet 64 and outlet 66. During use, a coolant, such as water, passes through the inlet 64, circulates within the outer wall of the housing 50, and exits through the outlet 66. The coolant inlet and outlet are formed from stainless steel and have a diameter of, for example, 5 mm. As with the plasma gas inlet and the injection port, this diameter may also vary.

Referring to FIG. 2, the plasma gas inlets 62, the coolant inlet 64 and the coolant outlet 66 are all formed in a stainless steel chamber 68. The chamber 68 is a stainless steel square block 80 mm on a side. The chamber 68 is mounted onto the support stand 56 which, in turn, is mounted on the carriage 32 for movement along the target 30.

A high frequency generator (not shown) is electrically connected to the coil 52, powering the latter with a variable power output up to 80 kW at a frequency of approximately 5.0 MHz. In the preferred embodiment, the generator is a Model No. T-80-3 MC from Lepel Corporation, or equivalent. This generator is driven with a 60 Hz, 3-phase 460 V power supply to energize the plasma torch 40. As an alternative, a Model No. IG 60/5000 generator is available from Fritz Huttinger Electronic GmbH of Germany.

Figure 4:
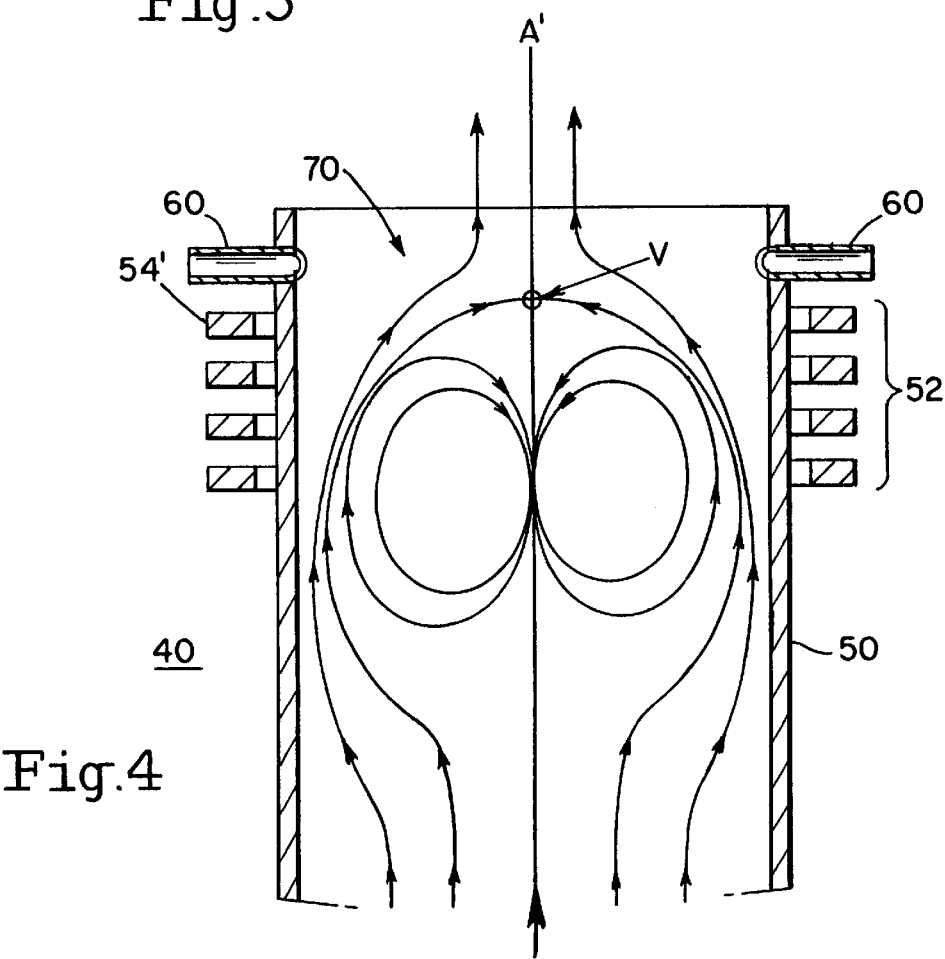
FIG. 4 shows a flow pattern of the plasma within the plasma torch of FIG. 3.

FIG. 4 depicts the plasma jet 70 formed within the plasma torch 40 when the dry plasma gas is fed through the inlets 62 and converted into a plasma. The plasma jet 70 is substantially symmetric about the torch's longitudinal axis A'. The position of the injection ports 60 is such that the source chemicals are introduced into the plasma just above a point V where the vertical velocity of said plasma is zero. This provides the needed structure of hydrodynamic and thermal flow of the source chemical jet into the border layers to realize efficient deposition onto the growing tubular member 34. In addition, the present inventors have identified that an injection arrangement just above the zero vertical velocity point reduces deposition of soot with the plasma torch. While the depicted embodiment has the injection ports 60 entering laterally into the housing, this is not an absolute requirement. Instead, the source gases may introduced into the center of the plasma jet 70 by a water cooled probe extending along the longitudinal axis A' of the plasma torch 40.

Figure 5:
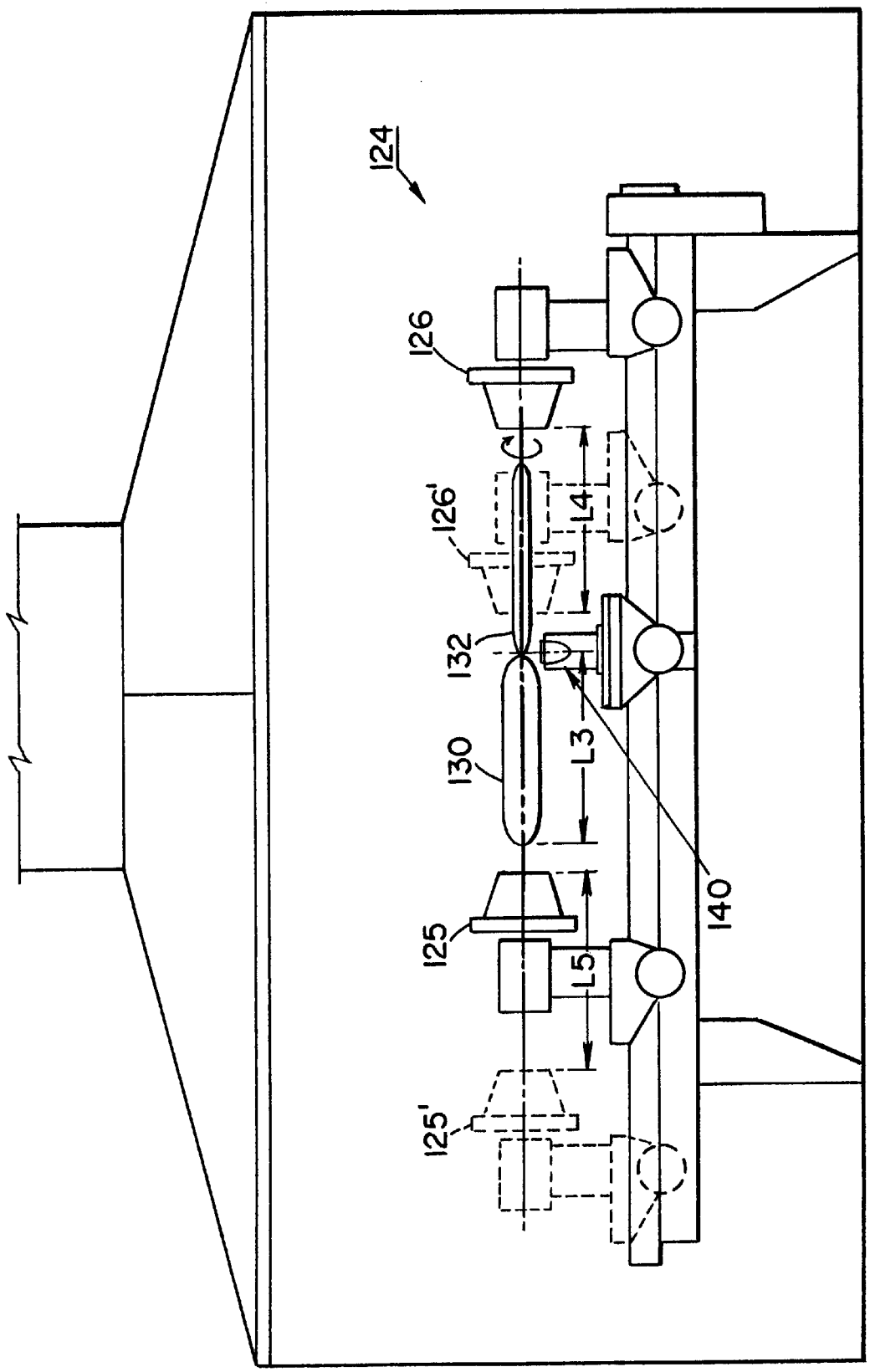
FIG. 5 shows an optical fiber preform made in accordance with the method of the present invention.

FIG. 5 illustrates a well-known procedure which can performed with a lathe 124, where the headstock 125 and tailstock 126 of the lathe 124 can move longitudinally relative to one another. This allows one to draw down a portion of a workpiece into a secondary rod of a reduced diameter comparable to that of the original target. This is accomplished by keeping the headstock 125 stationary and moving the tailstock 126 away from the headstock 125 while the plasma source 140 is moved in a direction opposite to that of tailstock 126. Alternatively, this can also be accomplished by placing a plasma source 140, or other heat source, at one end of the workpiece 130 to soften it. Then the headstock 125 and tailstock 126 are moved, respectively, to the positions shown in phantom 125', 126'. The result is a thin, secondary rod 132, which can (but need not) have the same diameter as the original target. As is known to those skilled in the art, the secondary rod has the same cross-sectional composition as the workpiece from which it is derived.

As shown in FIG. 5, the lathe 124 allows the headstock 125 and tailstock 126 to be moved far enough longitudinally to stretch the secondary rod to a distance L4, which is substantially the same as the length L3 of the workpiece from which it is derived. The secondary rod 132 may be cut from the workpiece, mounted on the lathe 124 in place of the workpiece 130, and used as a target for subsequent deposition with the plasma source 140.

As will be described, the apparatus of FIG. 5 provides for using the original, or first-generation, target to create a first generation workpiece, from which a secondary rod can be drawn to be used as a second-generation target. Deposition atop this second-generation target thereby form a second-generation workpiece, and so on. This iterative process of plasma deposition on a target to form a workpiece, stretching one end of the workpiece to form a reduced-diameter rod, and using this reduced-diameter rod as a subsequent target for further deposition can be repeated an arbitrary number of times.

Figure 6:
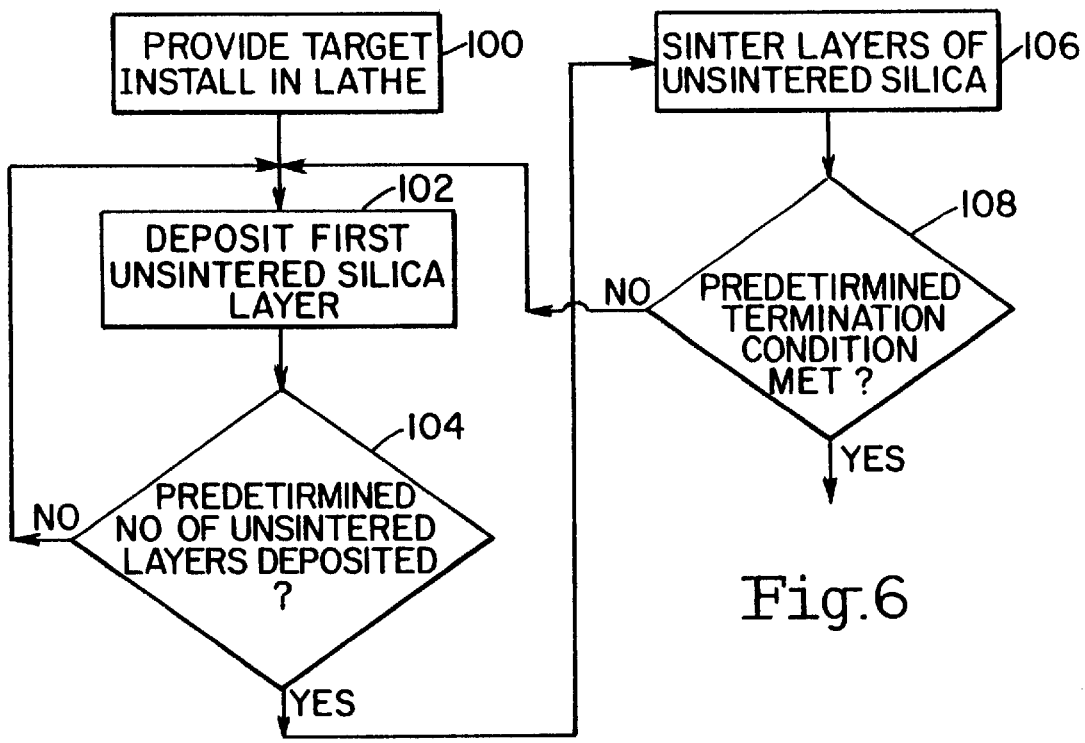
FIG. 6 shows an example flowchart of a method for making a preform according to the invention.

Referring to FIG. 6, a first method according to the present invention will now be described. To assist in the description, example dimensions and example values of variable quantities are given. It is to be understood, however, that the dimensions and quantity values are for purposes of example only, and that specific values are dictated by particular requirements which can be readily ascertained by one of skill in the art in view of the present disclosure.

This example of the first method begins at step 100 by providing a first generation target, horizontally mounted on a lathe, such as that shown in FIG. 5. The target is preferably formed from pure silica, which may be purchased from a commercial vendor, such as Product no. F300, available from Heraeus Amersil of Georgia. Alternatively, the first-generation target may be an Nth-generation doped silica rod formed using the current process. In this example, the first-generation target has a length of one meter and a diameter D1=30 mm.

Next, at step 102, the lathe rotates the first generation target at, for this example, 50 RPM, and traverses the plasma torch 40 along a length of the target at a rate, for this example, of 50 centimeters per minute to deposit a sublayer 20 micrometers thick of silica doped with $GeO_2$. It will be understood that the rotation rate of 50 RPM and the traversal rate of 50 centimeters per minute are for purposes of example only. Generally speaking, the deposition torch traversal speed can be 15 to 60 cm/min, the rotation speed can be 30 to 90 rpm. The thickness of every deposition layer is about 200 mm, and it is independent of the deposition speed.

At the specified rotation rate of 50 RPM and the linear rate of 20 centimeters per minute the plasma torch 40 only deposits the silica material, without sintering, as the rate is too high to heat the material sufficiently to effect sintering. The deposition process is repeated a predetermined plurality of times, the number of repetitions being checked at step 104. For this example, the number of repetitions is three.

After three repetitions there are three sublayers having an aggregate thickness of 60 micrometers. Next, at step 106, a deposition/sintering pass is made, which is identical to the first three deposition passes except that the traversal rate is slowed, for example, to 18 centimeters per minute. At this traversal rate the plasma torch 40 both deposits and sinters another sublayer and sinters the three previously deposited but unsintered sublayers. The result is a new sintered sublayer approximately 80 micrometers thick. Next, step 108 detects a termination condition which, if not met, causes steps 102 through 106 to be repeated, i.e., three more deposition passes are carried out at the first linear rate of 20 centimeters per minute, followed by another deposition/sintering pass at 18 centimeters per minute. The cycle of multiple deposition-only steps followed by a deposition/sintering step is repeated until the step 108 termination condition is met, the condition being: (a) a predetermined number of times, or (b) until the target has reached a predetermined diameter. The described method of the present invention of repeated deposition steps followed by a deposition/sintering step, hereafter referenced as "the periodic deposition/sintering method", attains a total deposition rate approximately twice that attainable using a repeated steps of deposition/sintering.

The dopant concentration for the $GeO_2$ deposited during periodic deposition sintering steps depends on the desired numerical aperture (NA) of the multimode optical fiber being produced. For instance, to form a fiber with a NA of 0.2, the maximum $GeO_2$ dopant concentration is approximately 10%. On the other hand, to form a fiber with a NA of 0.275, the maximum $GeO_2$ dopant concentration will be approximately 18%. The dopant concentration may be held at the same level during deposition, in which case a stepped layer, is formed. Alternatively, the dopant concentration may be gradually varied to form a graded layer. This is done by automatically controlling, by means of a microprocessor or like, an adjustable flow meter through which the dopant is introduced.

It will be understood that the cycle of three deposition-only steps followed by the deposition sintering step is for purposes of example only. Different cycles can be used, such as two deposition steps followed by a deposition/sintering step or four deposition steps before each deposition sintering step. The trade-off is in terms of aggregate deposition rate and deposition controllability.

It should also be understood that stepped and graded layers may succeed one another in subsequent generations of workpieces, and that layers having different, constant doping concentrations may succeed one another, as well. Thus, a graded layer may be deposited on the first-generation target, and a stepped layer may be deposited atop the second-generation target formed after drawing down the first-generation workpiece. Similarly, one may deposit a stepped layer atop a graded layer, which has been deposited atop an original first-generation target. Also, a first stepped layer, having a first dopant concentration, may be deposited atop a target, and a second stepped layer, having a second dopant concentration, deposited atop the next generation target. Additional layers, either graded or stepped, may be deposited atop any of the above structure.

One example for the described method deposits a silica doped with 18% $GeO_2$, as a stepped layer, atop the 6 mm diameter first generation target until a workpiece having a length of one meter and a diameter of D2=48 mm is formed (i.e., M 8). The deposition is preferably performed using the inventive periodic deposition/sintering method described above. This resulting first-generation workpiece has approximately 64 times the cross-sectional area of the original first-generation target. The first-generation workpiece is then drawn down into 64 first-generation doped silica rods, each having a length of one meter and a diameter of 6 mm. Each of these doped silica rods may then be used as a second-generation target.

Figure 7:
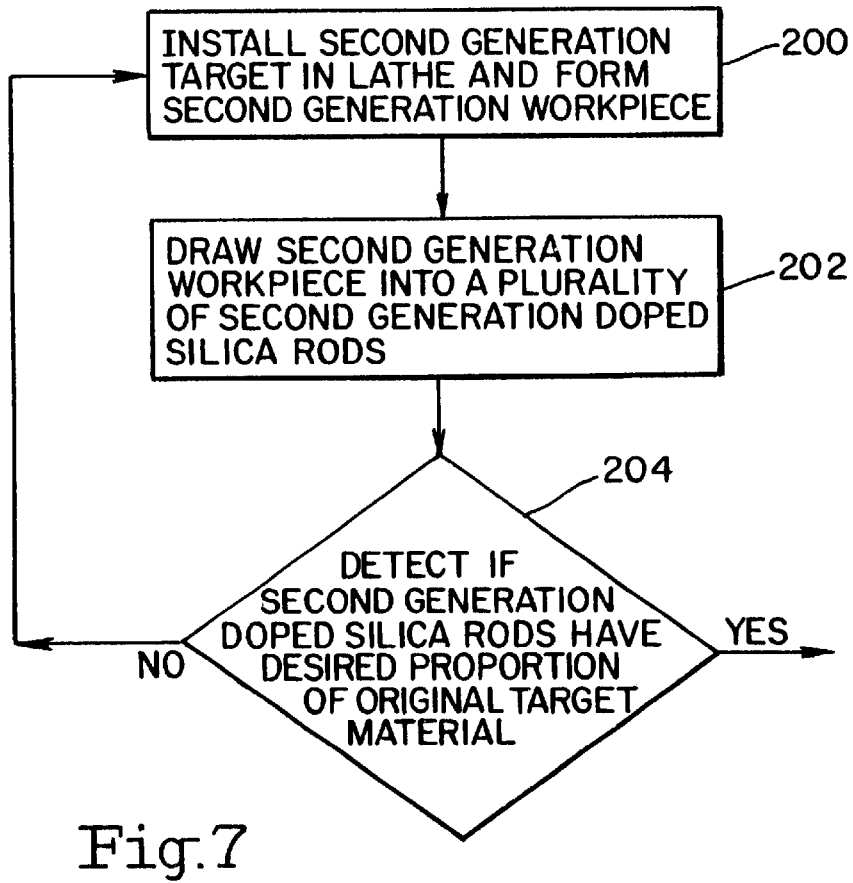
FIG. 7 shows an example flowchart for forming second generation workpieces according to the invention.

FIG. 7 shows an example flowchart of a method for processing second-generation targets. Referring to FIG. 7, at step 200 the second generation target is placed in the lathe arrangement of FIG. 5 and a second deposition layer is applied to form a second generation workpiece having a 48 mm diameter. The deposition is preferably performed using the inventive periodic deposition/sintering method described above for depositing the first doped silica layer on the first generation target. The second deposition is carried out using the same constant dopant concentration as the first deposition. Maintaining the dopant concentration at the same level throughout the deposition process results in a first-generation doped silica rod with a center formed from the original target material and an annular layer which has substantially the same composition therethrough. This ensures that the optical properties of the second layer is substantially the same as that of the first layer which was deposited on the original target. Next, at step 202, the second-generation workpiece is drawn down into 144 second-generation doped silica rods, each having a length of one meter and a diameter of 4 mm. Step 204 then detects whether the second-generation doped silica rods have the desired proportion of the original target material. Each of these may be used as a third-generation target and steps 200 and 202 repeated. It should be noted here that the iterative process may continue with the deposition of additional layers having the same dopant concentration. At some point, however, a workpiece with a desired proportion of original target material will be formed, after which no further iterations are needed. Indeed, this may even be reached after the first generation workpiece is formed.

As will be understood from this description, if the material being deposited atop the target is unchanged through the iterations, the result of N iterative steps is an $N^{th}$ generation rod having a very small center which is substantially identical in composition to the original target, and an annular layer composed of the materials deposited atop the target. For example, if the original target has a diameter D1 and the finished workpiece has a diameter D2=M×D1, then the proportion of the original target material in the first-generation workpiece is approximately $1/M^2$. If a second-generation target of diameter D1 is drawn from this workpiece and material sufficient to form a second-generation workpiece of diameter D2 is deposited thereon, the proportion of the original target material in the second generation workpiece is approximately $1/M^4$. Thus, it can be seen that one may readily form a workpiece having a predetermined proportion of the original target material therein by controlling M during deposition, along with the total number of iterations.

In one further example operation of the inventive method, a graded deposition layer having an outer diameter of approximately 80 mm is deposited atop the 4 mm diameter third-generation target. The dopant concentration starts out at a maximum value of 18% $GeO_2$ closest to the outer surface of the third-generation target, and is gradually reduced to a minimum value approximately 0.1% $GeO_2$ at its outermost portion, where the diameter is about 80 mm. This results in a third-generation workpiece having a center formed from the original target, two layers having substantially the same optical properties and fairly indistinguishable from one another, and a third, graded layer.

Table 1 hereinbelow shows an actual test comparison between the aggregate deposition rate using the periodic deposition/sintering method of this method, and the method in which each deposition pass also sinters the deposited material.

TABLE 1

| | | | | | | | | |
|---|---|---|---|---|---|---|---|---|
| Deposition Length | | 100 cm | | | | | | |
| Initial Target Diameter | | 30 mm | | | | | | |
| Rotation Speed | | 50 rpm | | | | | | |
| Pass # | Speed cm/min | Time minute | Layer Thickness □m | Initial Diameter mm | Finished Diameter mm | Deposited Volume cc | Weight g | Comments |
| Test 1 Simultaneous Deposition and Sintering | | | | | | | | |
| 1 | 20 | 5.0 | 200 | 30.0 | 30.2 | 9.46 | 20.8 | Deposition & Sintering |
| 2 | 20 | 5.0 | 200 | 30.2 | 30.4 | 9.52 | 20.9 | Deposition & Sintering |
| 3 | 20 | 5.0 | 200 | 30.4 | 30.6 | 9.58 | 21.1 | Deposition & Sintering |
| 4 | 20 | 5.0 | 200 | 30.6 | 30.8 | 9.64 | 21.2 | Deposition & Sintering |
| Total | | 20.0 | | | | | 84.0 | |
| Total Deposition Rate (g/min) | | | | 4.2 | | | | |
| Test 2 Deposition and Periodic Sintering | | | | | | | | |
| 1 | 50 | 2.0 | 200 | 30.0 | 30.2 | 9.46 | 20.8 | Deposition only |
| 2 | 50 | 2.0 | 200 | 30.2 | 30.4 | 9.52 | 20.9 | Deposition only |
| 3 | 50 | 2.0 | 200 | 30.4 | 30.6 | 9.58 | 21.1 | Deposition only |
| 4 | 18 | 5.6 | 200 | 30.6 | 30.8 | 9.64 | 21.2 | Deposition & Sintering |
| Total | | 11.6 | | | | | 84.0 | |
| Total Deposition Rate (g/min) | | | | 7.3 | | | | |

As can be seen from a comparison of Test 1 and Test 2, the deposition with periodic sintering demonstrates a deposition rate of 7.3 grams per minute, which is approximately twice the 4.2 gram per minute rate achieved by the simultaneous deposition/sintering method.

In still further example of the described method, the 80 mm diameter third-generation workpiece is subject to additional processing to form a primary optical fiber preform. More particularly, a cladding, or barrier, layer is deposited atop the third-generation workpiece. The thickness of the cladding layer depends on the type of finished optical fiber preform to be made. For a 62.5/125 fiber preform, the finished primary preform will have a final diameter of about 93 mm. For a 50/125 fiber preform, the finished primary preform will have a final diameter of about 96 mm. The cladding layer is formed by depositing silica doped at the same concentration of $GeO_2$ as the minimum doping concentration level used to form the third layer, i.e., 10% $GeO_2$. This results in a structure having the original target material at the center, a constantly doped pair of second layers having the same optical properties, a graded layer having a dopant concentration varying from a maximum value to a minimum value, and a cladding layer comprising silica doped at the minimum value.

Once the cladding layer is applied, the finished primary preform must be stretched to form the final preforms. From a single, 1 meter long 62.5/125 preform having a diameter of 93 mm diameter, one can obtain eight, one-meter long preform pieces, each having an outer diameter of 32 mm. As another example, from a single, 1 meter long 50/125 preform having a diameter of 96 mm diameter, one can obtain twelve, one-meter long pieces, each having an outer diameter of 27 mm.

A jacketing layer may be applied atop the cladding layer of these preform pieces. The jacketing layer preferably has the same index of refraction as pure silica. The jacket may be applied by plasma outside vapor deposition using pure silica. Alternatively, a tube or sheet of pure silica, having an appropriate diameter or width, may be provided around a preform piece, and heat applied to fuse the jacket onto the preform piece to form the final optical fiber preform. In the preferred embodiment, the final optical preform has an outer diameter of about 56 mm. This final preform may then be drawn into approximately 200 Km of fiber having a diameter of 125 $\mu$m.

Although, for best performance, a cladding and then a jacketing layer is applied, it should be noted that one may dispose of the cladding step and directly apply a jacketing tube to the third-generation workpiece, once it has been stretched.

A similar method for making single mode optical fiber preform can be achieved by using the following procedure. The starting target can be a pure silica rod that can be either a F300 rod purchased from Heraeus or a pure silica Nth-generation rod fabricated in house. Multiple fluorine doped silica layers with constant concentration are deposited on the target until it reaches a desired diameter. Single mode optical fibers can be drawn from this preform. There are many different glass index modifiers such as F, $GeO_2$, $P_2O_5$, $TiO_2$, $Al_2O_3$, etc., and in the proper combination, they can be used to make the doped core and/or doped cladding. In one preferred example embodiment, the target is an Nth-generation $GeO_2$ doped rod with pure silica or doped silica cladding layers deposited on it. The preform is completed when the desired diameter is reached.

While the present invention has been disclosed with reference to certain preferred embodiments, these should not be considered to limit the present invention. One skilled in the art will readily recognize that variations of these embodiments are possible, each falling within the scope of the invention, as set forth in the claims below.

Having thus described our invention, what we claim as new and desire to secure by Letters Patent is as follows:

1. A method for making an optical fiber preform comprising steps of:
    a) attaching a target rod to a rotatable support;
    b) depositing with a plasma torch a layer of a first unsintered silica on the target rod, the depositing including rotating the target rod and moving the plasma torch along a length of the target at a first rate;
    c) repeating said depositing step (b) a predetermined number of times to form a plurality of layers of the first unsintered silica above one another on said length of the target rod;
    d) sintering said plurality of concentric layers of the first unsintered silica to form a layer of sintered first silica by rotating the target rod and moving the plasma torch along a length of the target rod at a second rate, the second rate being lower than the first rate;
    e) repeating steps (b)–(d) to form a first intermediate preform having said target rod with a predetermined thickness of said layers of said sintered first silica deposited thereon.

2. A method according to claim 1 wherein said sintering step simultaneously deposits and sinters another layer of sintered first silica while sintering said plurality of layers of unsintered first silica previously deposited by said repeating said depositing step.

3. A method according to claim 2 further comprising steps of:
    f) drawing said new first intermediate preform into a new target rod;
    g) repeating steps (a) through (e) to form a new first intermediate preform; and
    h) repeating steps (f) and (g) a predetermined number of times to form a first preform.

4. A method according to claim 3 further comprising steps of:
    i) attaching said first preform to a rotatable support;
    j) depositing with a plasma torch a layer of a second unsintered silica on the first preform, the depositing including rotating the first preform and moving the plasma torch along a length thereof at a third rate;
    k) repeating said depositing step (j) a predetermined number of times to form a plurality of the layers of the second unsintered silica on the first preform;
    l) sintering the plurality of layers of the second unsintered silica by rotating the first intermediate preform and moving the plasma torch along a length thereof at a fourth rate, the fourth rate being lower than the third rate; and
    m) repeating steps (j)–(l) to form a second intermediate preform.

5. A method according to claim 4 wherein said sintering step (l) simultaneously deposits and sinters another layer of sintered second silica while sintering said plurality of said layers of the unsintered second silica previously deposited by said depositing step.

6. A method according to claim 5 further comprising steps of:
    n) drawing said second intermediate preform down into a new first preform;
    o) repeating steps (i) through (m) to form a new second intermediate target; and
    p) repeating steps (n) and (o) a predetermined number of times to form a second preform.

7. A method according to claim 4 further comprising steps of:

n) drawing said second intermediate preform down into a new first preform;

o) repeating steps (i) through (m) to form a new second intermediate target; and p) repeating steps (n) and (o) a predetermined number of times to form a second preform.

8. A method according to claim 3, wherein said plasma torch comprises a coil having a plurality of windings around a coil axis, and wherein said depositing includes introducing a plasma gas into an interior of said coil to form a plasma, the plasma having a velocity field such that there is a point most proximal to the target from among a plurality of one or more points at which there is a plasma flow intersecting the axis of the coil and having a zero velocity in the direction of the axis, and injecting a source gas and a dopant into a region in communication with said plasma, wherein the injecting is such that the source gas is introduced into the plasma just above said point most proximal to the target.

9. A method according to claim 2, wherein said plasma torch comprises a coil having a plurality of windings around a coil axis, and wherein said depositing step includes introducing a plasma gas into an interior of said coil to form a plasma, the plasma having a velocity field such that there is a point most proximal to the target from among a plurality of one or more points at which there is a plasma flow intersecting the axis of the coil and having a zero velocity in the direction of the axis, and injecting a source gas and a dopant into a region in communication with said plasma, wherein the injecting is such that the source gas is introduced into the plasma just above said point most proximal to the target.

10. A method according to claim 1 further comprising steps of:

f) drawing said new first intermediate preform into a new target rod;

g) repeating steps (a) through (e) to form a new first intermediate preform; and h) repeating steps (f) and (g) a predetermined number of times to form a first preform.

11. A method according to claim 10, wherein said plasma torch comprises a coil having a plurality of windings around a coil axis, and wherein said depositing step includes introducing a plasma gas into an interior of said coil to form a plasma, the plasma having a velocity field such that there is a point most proximal to the target from among a plurality of one or more points at which there is a plasma flow intersecting the axis of the coil and having a zero velocity in the direction of the axis, and injecting a source gas and a dopant into a region in communication with said plasma, wherein the injecting is such that the source gas is introduced into the plasma just above said point most proximal to the target.

12. A method according to claim 10 wherein said plasma torch comprises a coil having a plurality of windings around a coil axis and wherein said coil has an extreme surface closest to said target rod and wherein said depositing includes steps of: detecting a diameter of said target rod, and automatically adjusting a distance between said extreme surface of said coil and the target rod based on said detected diameter.

13. A method according to claim 1, wherein said plasma torch comprises a coil having a plurality of windings around a coil axis, and wherein said depositing step includes introducing a plasma gas into an interior of said coil to form a plasma, the plasma having a velocity field such that there is a point most proximal to the target from among a plurality of one or more points at which there is a plasma flow intersecting the axis of the coil and having a zero velocity in the direction of the axis, and injecting a source gas and a dopant into a region in communication with said plasma, wherein the injecting is such that the source gas is introduced into the plasma just above said point most proximal to the target.

14. A method according to claim 13, wherein said plasma torch further comprises a pair of stabilizer bars, one extending outward with respect to said axis from one side of a portion of said coil proximal to said target and one extending outward with respect to said axis from an opposite side of said portion of said coil, said pair of stabilizer bars being substantially parallel to said target rod during said depositing step.

15. A method according to claim 13 wherein said depositing includes detecting a diameter of said target rod, and automatically adjusting a distance between a surface of said coil closest to said target rod and the target rod based on said detected diameter.

16. A method according to claim 1, wherein said plasma torch comprises a coil having a plurality of windings around a coil axis and having a pair of stabilizer bars, one extending outward with respect to said axis from one side of a portion of said coil proximal to said target and one extending outward with respect to said axis from an opposite side of said portion of said coil, said pair of stabilizer bars being substantially parallel to said target rod during said depositing step.

17. A method according to claim 16 wherein said depositing includes detecting a diameter of said target rod, and automatically adjusting a distance between a surface of said coil closest to-said target rod and the target rod based on said detected diameter.

18. A method according to claim 1 wherein said plasma torch comprises a coil having a plurality of windings around a coil axis and wherein said coil has an extreme surface closest to said target rod and wherein said depositing step includes detecting a diameter of said target rod, and automatically adjusting a distance between said extreme surface of said coil and the target rod based on said detected diameter.

* * * * *